United States Patent [19]

Hanaoka et al.

[11] Patent Number: 4,773,278
[45] Date of Patent: Sep. 27, 1988

[54] ENGAGEMENT ARRANGEMENT FOR ACCELERATION CABLE AND PEDAL

[75] Inventors: Motoyoshi Hanaoka, Yokohama; Akira Nakamura, Zama, both of Japan

[73] Assignee: Nissan Motor Co., Ltd., Japan

[21] Appl. No.: 930,425

[22] Filed: Nov. 14, 1986

[30] Foreign Application Priority Data

Nov. 14, 1985 [JP] Japan .................. 60-175942[U]

[51] Int. Cl.$^4$ .................. F16C 1/10; G05G 1/14
[52] U.S. Cl. .................. 74/500.5; 74/512; 74/560; 248/634
[58] Field of Search .......... 74/501 R, 501 A, 501 F, 74/501 B, 501.5 R, 502, 512, 513, 560, 470, 487; 403/220, 224; 248/634, 560; 24/128

[56] References Cited

U.S. PATENT DOCUMENTS

| 600,536 | 6/1960 | Bergsten | 74/560 |
|---|---|---|---|
| 2,232,667 | 2/1941 | Saurer | 403/224 X |
| 2,824,464 | 2/1958 | Remington | 403/224 X |
| 2,845,812 | 8/1958 | Pobar | 74/501 D |
| 3,730,318 | 5/1973 | Camp | 74/501 F |
| 3,844,183 | 10/1974 | Wilke | 74/512 X |
| 3,916,723 | 11/1975 | Hawtree | 74/501 D X |
| 4,263,998 | 8/1981 | Moriya | 74/512 X |
| 4,546,666 | 10/1985 | Secord | 74/513 X |

FOREIGN PATENT DOCUMENTS

| 2237301 | 3/1973 | Fed. Rep. of Germany | 74/513 |
|---|---|---|---|
| 50-128824 | 10/1975 | Japan . | |
| 51-44505 | 10/1976 | Japan . | |
| 54-146526 | 10/1979 | Japan . | |
| 57-77037 | 5/1982 | Japan . | |
| 60-99729 | 6/1985 | Japan | 74/513 |

Primary Examiner—Gary L. Smith
Assistant Examiner—Rodney M. Lindsey
Attorney, Agent, or Firm—Leydig, Voit & Mayer

[57] ABSTRACT

An engagement arrangement for mechanically connecting an accelerator cable leading to an engine carburetor and an accelerator pedal to be depressed by a driver. The engagement arrangement consists of an engagement member provided at one end section of the accelerator cable and is supported through a guide collar by a pedal lever with the accelerator pedal in such a manner that the accelerator cable passes through a through-hole of the pedal lever. A vibration insulating member made of an elastomeric material is secured to the pedal lever and located on the opposite side of the pedal lever from the engagement member. The accelerator cable passes through a through-hole of the insulating member in such a manner as to be in contact with the wall surface the through-hole, thereby damping vibration transmitted from the engine through the accelerator cable.

20 Claims, 2 Drawing Sheets

ENGAGEMENT ARRANGEMENT FOR ACCELERATION CABLE AND PEDAL

BACKGROUND OF THE INVENTION

1. Field of the Invention

The present invention relates generally to an engagement arrangement for mechanically connecting an acceleration cable and an accelerator pedal, and more particularly to an improvement in such an engagement arrangement to effectively damp engine vibration transmitted through the acceleration cable.

2. Description of the Prior Art

Hitherto an engagement arrangement for mechanically connecting an accelerator cable and an acceleration pedal has been proposed as disclosed, for example, in Japanese Utility Model Provisional (First) Publication No. 57-77037, in which the accelerator cable connected to a carburetor throttle valve is provided at its one end with a metal stop member which is supported through a guide collar to a pedal lever provided with an accelerator pedal, so that the driver's depression force to the accelerator pedal is transmitted through the accelerator cable to the throttle valve. The metal stop member securely supported through the guide collar to the pedal lever thereby prevents the accelerator cable from coming off from the pedal lever. However, with such a conventional engagement arrangement, vibration from the engine is transmitted through the accelerator cable to the accelerator pedal, thus giving vehicle passengers an unpleasant feeling.

SUMMARY OF THE INVENTION

An engagement arrangement for connecting an accelerator cable and an accelerator pedal, according to the present invention comprises a pedal lever to which the accelerator pedal is fixedly connected. The accelerator cable is provided at its one end section with an engagement member which is supported by the pedal lever and located on one side of the pedal lever in such a manner that the accelerator cable passes through a through-hole formed in the pedal lever. A vibration insulating member is supported by the pedal lever and located on the other side of the accelerator pedal so that the engagement member and the vibration insulating member are opposite to each other with respect to the pedal lever. The vibration insulating member is formed with a through-hole through which the accelerator cable passes, in which the accelerator cable is in contact with the wall surface defining the through-hole.

By virtue of the fact that the accelerator cable is in contact with the wall surface of the through-hole of the insulating member, vibration transmitted from an engine through the accelerator cable is effectively absorbed and damped by the vibration insulating member, thus preventing the vibration from being transmitted to the accelerator pedal. This reduces vehicle passenger's unpleasant feeling due to the vibration transmitted through the acceleration pedal. Furthermore, the vibration is prevented from being transmitted, through the accelerator cable and pedal to the vehicle body, thereby preventing generation of noise inside a passenger compartment.

BRIEF DESCRIPTION OF THE DRAWINGS

In the drawings, like reference numerals designate corresponding elements and parts, in which.

DETAILED DESCRIPTION OF THE INVENTION

Figure 1:
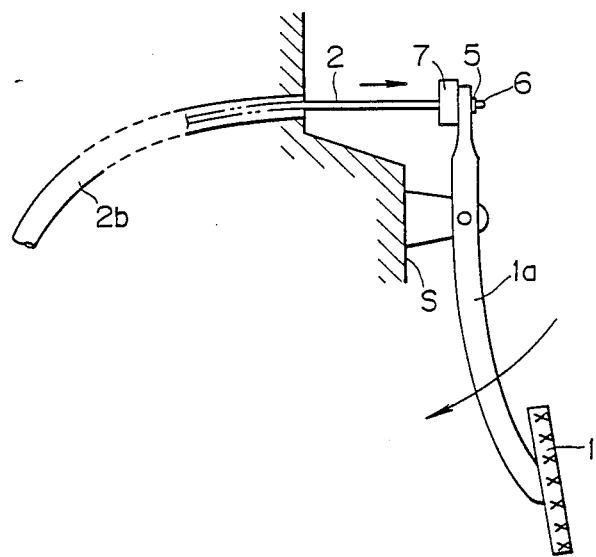
FIG 1 is a schematic illustration of a first embodiment of an engagement arrangement in accordance with the present invention.
Figure 2:
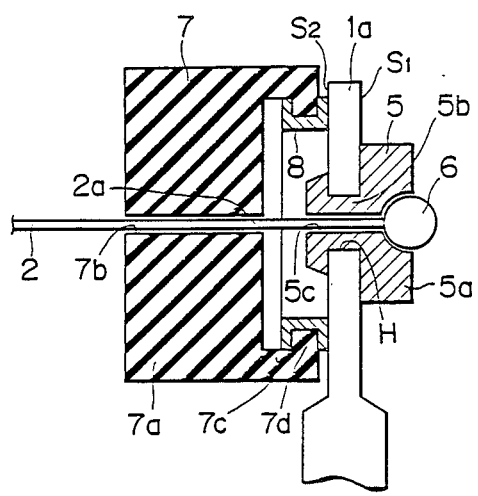
FIG. 2 is a vertical sectional view of the engagement arrangement of FIG. 1.

Referring now to FIGS. 1 and 2, there is shown a first embodiment of an engagement arrangement for mechanically connecting an accelerator cable (or operation cable) 2 and an accelerator pedal 1, in accordance with the present invention. The engagement arrangement of this embodiment is of an automotive vehicle and comprises a pedal lever 1a which is pivotally movably connected at its central portion to a vehicle body S. The pedal lever 1a is provided at its lower end section with the accelerator pedal 1. The pedal lever 1a is provided at its upper end section with a guide collar 5. The guide collar 5 is made of a plastic such as polyacetal and includes an annular head section 5a and a cylindrical section 5b. The annular head section 5a is located on one side of the pedal lever 1a and in contact with a side surface $S_1$ of the pedal lever 1a. The cylindrical section 5b has a diameter smaller than that of the annular head section 5a and securely disposed within a through-hole H in the pedal lever 1a so that the guide collar 5 moves together with the pedal lever 1a as a single member.

The accelerator cable 2 has one end section 2a to which an engagement member (mass damper) 6 made of metal is secured. The other end section (not shown) of the accelerator cable 2 is connected to a control member for controlling engine speed of an automotive engine though not shown. The engagement member 6 is fittingly supported in a depression (no numeral) formed in the guide collar head section 5a in such manner as to be located separate from the pedal lever side surface $S_1$. As shown, the one end section 2a of the accelerator cable 2 is passed through a through-hole 5c of the guide collar 5 so as to be generally perpendicular to the side surface $S_1$. It will be understood that the accelerator cable 2 constitutes, with an outer tube 2b, an accelerator cable assembly (no numeral).

A vibration insulating member 7 is located on the opposite side of the pedal lever 1a from the engagement member 6 and securely connected through a retainer 8 to the pedal lever 1a. The vibration insulating member 7 is formed of a vibration insulating (damping) material or elastomeric material such as rubber. The vibration insulating member 7 is generally C-shaped in cross-section and includes a solid cylindrical main body section 7a which is formed with a central through-hole 7b which is aligned with the through-hole 5c of the guide collar 5. The main body section 7a is integrally formed with an annular peripheral projection section 7c which is coaxial with the main body section 7a and projects from the main body section 7a toward the pedal lever 1a. Additionally, the annular peripheral projection section 7c is integrally formed with an annular engaging section 7d which is coaxial with the projection section 7c and extends radially inwardly from the projection section 7c. The engaging section 7d engages in an annular channel (no numeral) of the annular retainer 8 having a generally C-shaped cross-section. The annular retainer 8 is secured to a side surface $S_2$ opposite to the side surface $S_1$ so that the annular retainer 8 moves with the pedal lever 1a as a single member. As shown, the end section 2a of the accelerator cable 2 passes through the central through-hole 7b in such a manner as to be in contact with the wall surface of the through-hole 7b. In other words, the diameter of the central through-hole 7b is set to be sufficiently small to produce a frictional force between the wall surface of the central through-hole 7b and the surface of the acceleration cable end section 2a.

With the thus configured engagement arrangement between the accelerator cable and the accelerator pedal, when the accelerator cable 2 makes its small displacement or vibration owing to vibration from the engine, such vibration is damped or absorbed by generating frictional force between the wall surface of the vibration insulating member central through-hole 7b and the surface of the accelerator cable end section 2a, thereby damping or insulating vibration to be transmitted from the engine through the accelerator cable 2 to the accelerator pedal 1 and to the vehicle body S.

Figure 3:
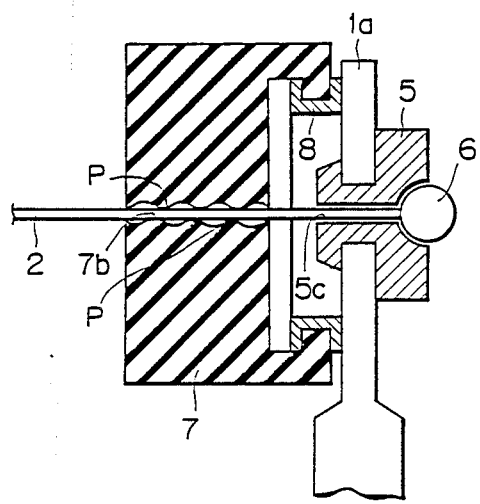
FIG. 3 is a vertical sectional view similar to FIG. 2B but showing a second embodiment of the engagement arrangement in accordance with the present invention.

FIGS. 3 illustrates a second embodiment of the engagement arrangement according to the present invention, similar to the first embodiment of FIG. 1 and 2 except for the shape of the surface of the central through-hole 7b of the vibration insulating member 7. In this embodiment, a plurality of projections P having wave-shaped cross-section are formed on the wall surface of the vibration insulating member through-hole 7b in such a manner that the surface of each projection is in contact with the surface of the accelerator cable 2. Accordingly, also with this arrangement, engine vibration transmitted through the accelerator cable 2 is absorbed through the projections P to be damped, thereby preventing vibration transmission to the accelerator pedal 1 and to the vehicle body S.

Figure 4:
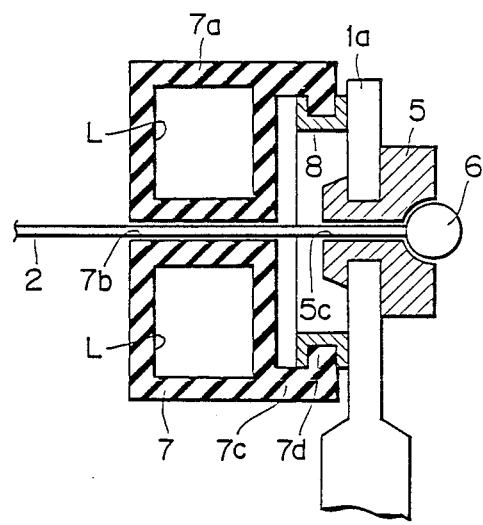
FIG. 4 is a vertical sectional view similar to FIG. 2B but showing a third embodiment of the engagement arrangement in accordance with the present invention.

FIG. 4 illustrates a third embodiment of the engagement arrangement according to the present invention, which is similar to the first embodiment of FIGS. 1 and 2 except for the cross-sectional shape of the main body section 7a of the vibration insulating member 7. In this embodiment, an annular hollow L is formed in the vibration insulating member main body section 7a. The annular hollow L is coaxial with the main body section 7a and has a rectangular cross-section. It is to be noted that the annular hollow L is confined in the main body section 7a and therefore does not communicate with ambient air. Accordingly, with this arrangement, the weight of the vibration insulating rubber 7 is reduced while providing a sufficient elasticity of the vibration insulating member 7 to effectively damp vibration transmitted through the accelerator cable under the effect of friction between the wall surface of the through-hole 7b and the surface of the accelerator cable 2.

Figure 5:
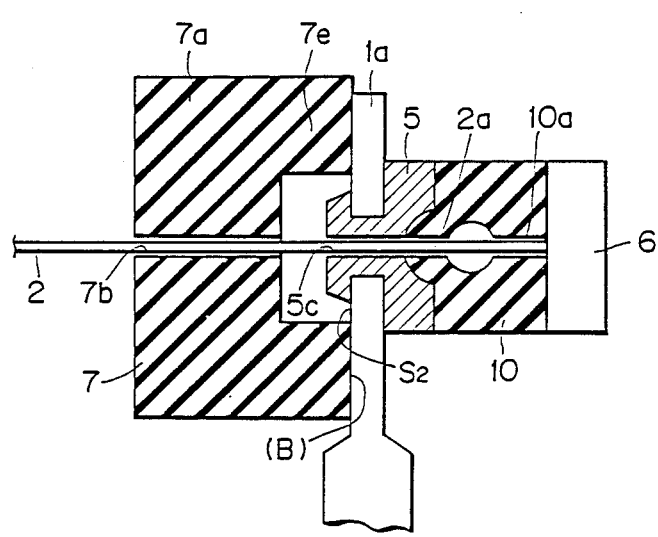
FIG. 5 is a vertical sectional view of a fourth embodiment of the engagement arrangement in accordance with the present invention.

FIG. 5 illustrates a fourth embodiment of the engagement arrangement according to the present invention, similar to the first embodiment of FIGS. 1 and 2. In this embodiment, the engagement member 6 is so formed as to have a rectangular cross-section and formed larger in mass than that of the first embodiment. An additional vibration insulating member made of rubber is interposed between the guide collar 5 and the engagement member 6 in such a manner that the accelerator cable end section 2a passes through a through-hole 10a of the vibration insulating member 10. The through-hole 10a is aligned with the through-hole 5c of the guide collar 5. The vibration insulating member 10 is formed at its central section with a generally spherical hollow (no numeral) with which the through-hole 10a merges. In this embodiment, the vibration insulating member 7 is generally C-shaped to have an annular projection 7e which is coaxial with the main body section 7a and projects toward the pedal lever 1a. The annular projection 7e is directly secured to the side surface $S_2$ of the pedal lever 1a by means of baking and adhesion as indicated at (B). With this arrangement, so-called dynamic damper function is provided under coaction of the two vibration insulating members 7, 10 thereby accomplishing a further effective vibration damping or insulating action.

What is claimed is:

1. An engagement arrangement for connecting an accelerator cable and an accelerator pedal, comprising:
   a pedal lever provided with the accelerator pedal;
   an engagement member secured to an end section of said accelerator cable, said engagement member being supported by said accelerator pedal to transmit movement of said accelerator pedal to said accelerator cable and located on a first side of said pedal lever so that said accelerator cable passes through a through-hole of said pedal lever;
   a vibration insulating member of elastomeric material supported by said pedal lever independently of said engagement member and located on a second side of said pedal lever, said second side being opposite to said first side with respect to said pedal lever, said vibration insulating member being formed with a through-hole through which said accelerator cable passes; and
   means for allowing said accelerator cable to be in contact with a wall surface defining said through-hole of said vibration insulating member.

2. An engagement arrangement as claimed in claim 1, wherein said pedal lever has a first end section to which said engagement meber is supported, and a second end section to which said accelerator pedal is fixedly connected, said pedal lever being pivotally connected at a portion between said first and second end sections to a vehicle body.

3. An engagement arrangement as claimed in claim 1, further comprising a guide collar through which said engagement member is supported by said pedal lever, said guide collar being secured to said pedal lever and located on said first side of said pedal lever, said guide collar being formed with a through-hole through which said accelerator cable passes.

4. An engagement arrangement as claimed in claim 3, wherein said guide collar includes a cylindrical section securely disposed within the through-hole of said pedal lever, and a head section for receiving said engagement member, having a cross-sectional area larger than that of said cylindrical section, wherein said cylindrical section and said head section are respectively formed with through-holes which are aligned with each other so that said accelerator cable passes through said through-holes.

5. An engagement arrangement as claimed in claim 4, wherein said guide collar head section is formed with a depression in which said engagement member is received.

6. An engagement arrangement as claimed in claim 1, further comprising a retainer to which said vibration insulating member is secured, said retainer being secured to said accelerator pedal and located on said second side of said pedal lever.

7. An engagement arrangement as claimed in claim 6, wherein said vibration insulating member includes a main body section formed with said through-hole, an annular projection section projected from said main body section toward said pedal lever, and an annular engagement section extending radially inwardly to engage with said retainer.

8. An engagement arrangement as claimed in claim 7, wherein said retainer is annular and has an annular channel in which said vibration insulating member annular engagement section engages.

9. An engagement arrangement as claimed in claim 3, wherein said through-holes of said vibration insulating member and said guide collar are aligned with each other, wherein said accelerator cable is generally perpendicular to said pedal lever.

10. An engagement arrangement as claimed in claim 3, further comprising another vibration insulating member to which said engagement member is supported, said another vibration insulating member is interposed between said engagement member and said guide collar, said another vibration insulating member being formed with a through-hole through which said accelerator cable passes, said through-hole being aligned with said through-hole of said guide collar.

11. An engagement arrangement as claimed in claim 1, wherein said elastomeric material is rubber.

12. An engagement arrangement as claimed in claim 1, wherein said vibration insulating member is formed at said wall surface with a plurality of projections which are in contact with said accelerator cable.

13. An engagement arrangement as claimed in claim 12, wherein said projections are arranged to have wave form in cross-section.

14. An engagement arrangement as claimed in claim 1, wherein said vibration insulating member is formed with a hollow confined by a wall of said vibration insulating member.

15. An engagement arrangement as claimed in claim 14, wherein said hollow is annular and coaxial with said through-hole of said vibration insulating member.

16. An engagement arrangement as claimed in claim 15, wherein said annular hollow is rectangular in cross-section.

17. An engagement arrangement as claimed in claim 10, wherein said another vibration insulating member is made of an elastomeric material.

18. An engagement arrangement as claimed in claim 10, wherein said another vibration insulating member is formed therein with a hollow which merges with said through-hole of said another vibration insulating member.

19. An engagement arrangement as claimed in claim 10, wherein said vibration insulating member is directly secured to said pedal lever.

20. An engagement arrangement as claimed in claim 19, wherein said vibration insulating member includes a main body section formed with said through-hole, and an annular projection section projected from said main body toward said pedal lever.

* * * * *